United States Patent
Mammadov et al.

(10) Patent No.: US 9,714,167 B2
(45) Date of Patent: Jul. 25, 2017

(54) PROCESS FOR CONVERTING OF METHANE STEAM REFORMING SYNGAS WITH $CO_2$

(71) Applicant: SAUDI BASIC INDUSTRIES CORPORATION, Riyadh (SA)

(72) Inventors: Aghaddin Kh. Mammadov, Houston, TX (US); Shahid Shaikh, Houston, TX (US); Clark David Rea, Houston, TX (US)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 15/116,289

(22) PCT Filed: Mar. 31, 2015

(86) PCT No.: PCT/US2015/023589
§ 371 (c)(1),
(2) Date: Aug. 3, 2016

(87) PCT Pub. No.: WO2015/153610
PCT Pub. Date: Oct. 8, 2015

(65) Prior Publication Data
US 2017/0015549 A1     Jan. 19, 2017

Related U.S. Application Data

(60) Provisional application No. 61/974,526, filed on Apr. 3, 2014.

(51) Int. Cl.
| | |
|---|---|
| *C01B 3/00* | (2006.01) |
| *C01B 3/38* | (2006.01) |
| *C10G 2/00* | (2006.01) |
| *C10K 3/02* | (2006.01) |
| *B01J 23/889* | (2006.01) |
| *C01B 31/18* | (2006.01) |

(52) U.S. Cl.
CPC ............ *C01B 3/00* (2013.01); *B01J 23/8892* (2013.01); *C01B 3/382* (2013.01); *C10G 2/32* (2013.01); *C10G 2/33* (2013.01); *C10G 2/331* (2013.01); *C10G 2/332* (2013.01); *C10G 2/333* (2013.01); *C10K 3/026* (2013.01); *C01B 31/18* (2013.01); *C01B 2203/0233* (2013.01); *C01B 2203/0238* (2013.01); *C01B 2203/0495* (2013.01); *C01B 2203/062* (2013.01); *C01B 2203/1058* (2013.01); *C01B 2203/1076* (2013.01); *C01B 2203/148* (2013.01); *C01B 2203/86* (2013.01); *C10G 2300/1025* (2013.01); *Y02P 20/142* (2015.11); *Y02P 20/52* (2015.11); *Y02P 30/30* (2015.11)

(58) Field of Classification Search
CPC .... C01B 2203/0238; C01B 2203/0435; C01B 31/18; C01B 3/16; C10G 2/30
See application file for complete search history.

(56) References Cited

U.S. PATENT DOCUMENTS

| | | | |
|---|---|---|---|
| 1,913,364 | A | 6/1933 | Bader et al. |
| 3,479,149 | A | 11/1969 | Frilette |
| 4,216,194 | A | 8/1980 | Regier |
| 5,346,679 | A | 9/1994 | Osaki et al. |
| 5,496,530 | A | 3/1996 | Vannby et al. |
| 6,328,945 | B1 | 12/2001 | Hufton et al. |
| 7,329,627 | B2 | 2/2008 | Wanninger et al. |
| 8,551,434 | B1 | 10/2013 | Mammadov et al. |
| 2003/0113244 | A1 | 6/2003 | Dupont et al. |
| 2003/0172590 | A1 | 9/2003 | Bhattacharyya et al. |
| 2010/0105962 | A1 | 4/2010 | Mamedov et al. |
| 2010/0111795 | A1 | 5/2010 | Cremona et al. |
| 2010/0190874 | A1 | 7/2010 | Mamedov et al. |
| 2011/0301386 | A1 | 12/2011 | Mamedov et al. |
| 2013/0150466 | A1 | 6/2013 | Mamedov et al. |

FOREIGN PATENT DOCUMENTS

| | | |
|---|---|---|
| CN | 1416404 A | 5/2003 |
| CN | 1880414 A | 12/2006 |
| EP | 1445235 A2 | 8/2004 |
| GB | 2168718 A | 6/1986 |
| GB | 2279583 A | 1/1995 |
| WO | 2008131898 A1 | 11/2008 |
| WO | 2010069549 A1 | 6/2010 |

OTHER PUBLICATIONS

Chen et al; "Study of iron-promoted Cu/SiO2 catalyst on high temperature reverse water gas shift reaction"; Applied Catalysis A: General 257 (2004); pp. 97-106.
International Search Report for International Application No. PCT/US2015/023589; International Filing Date Mar. 31, 2015; Date of Mailing Sep. 17, 2015; 4 pages.
Michorczyk et al.; "Simultaneous Propane Dehydrogenation and CO2 Hydrogenation Over CrOx/SiO2 Catalyst", React.Kinet.Catal.Lett.; vol. 87; No. 1; (2006), pp. 177-183.
Qi et al.; "A novel catalyst for DME systhesis from CO hydrogenation 1. Activity, structure and surface properties"; Journal of Molecular Catalysts A: Chemical 176 (2001); pp. 195-203.
Suzuki et al.; "Selective Hydrogenation of CO2 to CO in the Presence of Excess CO on a MoO3/ZnO Catalyst—A Preliminary Attempt to Yield an Equimolecular Mixture of H2 and CO"; Int. J. Hydrogen Energy; vol. 20; No. 10; pp. 823-830; 1995.
Wang et al.; "Recent advances in catalytic hydrogenation of carbon dioxide"; Chem. Soc. Rev.; vol. 40; No. 7; pp. 3369-4260; Jul. 2011.
Written Opinion of the International Search Report for International Application No. PCT/US2015/023589; International Filing Date Mar. 31, 2015; Date of Mailing Sep. 17, 2015; 6 pages.

*Primary Examiner* — Jafar Parsa
(74) *Attorney, Agent, or Firm* — Cantor Colburn LLP

(57) ABSTRACT

In an embodiment, a process of making $C_{2+}$ hydrocarbons comprises contacting a feed comprising a methane steam reforming gas and an additional carbon dioxide with a manganese oxide-copper oxide catalyst to produce a product syngas in a contacting zone under isothermal conditions at a temperature of 620 to 650° C.; and converting the product syngas to $C_{2+}$ hydrocarbons in the presence of a Fischer-Tropsch catalyst; wherein the methane steam reforming gas has an initial $H_2$:CO volume ratio greater than 3; wherein the product syngas has a $H_2$:CO volume ratio of 1.5 to 3; and wherein the contacting further comprises removing water.

20 Claims, No Drawings

PROCESS FOR CONVERTING OF METHANE STEAM REFORMING SYNGAS WITH CO₂

CROSS REFERENCE TO RELATED APPLICATIONS

This application is a National Stage application of PCT/US2015/023589, filed Mar. 31, 2015, which claims the benefit of U.S. Provisional Application No. 61/974,526, filed Apr. 3, 2014, both of which are incorporated by reference in their entirety herein.

TECHNICAL FIELD

The present disclosure relates to a process for increasing the carbon monoxide content of a methane steam reforming syngas.

BACKGROUND

Synthetic gas (also referred to herein as syngas), is a gaseous mixture containing hydrogen ($H_2$) and carbon monoxide (CO), which can further comprise other gas components such as one or more of carbon dioxide ($CO_2$), water ($H_2O$), methane ($CH_4$), nitrogen ($N_2$). In the past decades, numerous processes have been developed to produce syngas due to its successful use as synthetic fuel and also in a number of chemical processes, such as synthesis of methanol, ammonia, Fischer-Tropsch type synthesis and other olefin syntheses, hydroformylation reactions, carbonylation reactions, reduction of iron oxides in steel production, etc.

Natural gas and (light) hydrocarbons are the predominant starting material for making syngas. For example, syngas can be produced using methane as the dominate feedstock, by steam reforming, partial oxidation, $CO_2$ reforming, or by a so-called auto-thermal reforming reaction. One of the disadvantages associated with syngas production by steam reforming of methane, which is the most widely applied process to produce syngas, is that the composition of the produced gas mixture is limited by the reaction stoichiometry to $H_2$/CO ratios of 3 or higher, for example, of greater than or equal to 5.

There remains a need in the art for processes for the conversion of $CO_2$ to syngas such that the ratio of $H_2$/CO is less than 3.

BRIEF SUMMARY

Disclosed herein are methods for the conversion of methane steam reforming syngas.

In an embodiment, a process of making $C_{2+}$ hydrocarbons comprises contacting a feed comprising a methane steam reforming gas and an additional carbon dioxide with a manganese oxide-copper oxide catalyst to produce a product syngas in a contacting zone under isothermal conditions at a temperature of 620 to 650 degree Celsius (° C.); and converting the product syngas to $C_{2+}$ hydrocarbons in the presence of a Fischer-Tropsch catalyst; wherein the methane steam reforming gas has an initial $H_2$:CO volume ratio greater than 3; wherein the product syngas has a $H_2$:CO volume ratio of 1.5 to 3; and wherein the contacting further comprises removing water.

In another embodiment, a method of adjusting an $H_2$:CO ratio in a methane steam reforming gas, comprises contacting a methane steam reforming gas and an additional carbon dioxide in a conversion zone; wherein the methane steam reforming gas comprises CO and $H_2$ and has a $H_2$:CO ratio of greater than or equal to 4; and reacting $CO_2$ and the $H_2$ in the presence of a manganese oxide-copper oxide catalyst to produce a product stream having an $H_2$:CO ratio of less than or equal to 2.5; and removing water from the contacting zone.

The above described and other features are exemplified by the following detailed description.

DETAILED DESCRIPTION

The Applicants discovered that they could contact a feed gas comprising a syngas produced from a methane steam reforming process and an additional carbon dioxide with a catalyst (e.g., manganese oxide catalyst) to result in a product gas with an $H_2$/CO ratio of 1.5 to 3, preferably, 2 to 2.5 such that the product gas can be used in a Fischer-Tropsch reaction. Accordingly, the excess hydrogen available in the syngas produced from the methane steam reforming process is advantageously utilized to optimize the amount of carbon monoxide formed. The Applicants surprisingly discovered that they could achieve one or both of an increased conversion and reduced coking by performing this reaction under isothermal conditions at an increased temperature of 620 to 650° C.

The contacting feed comprises a methane steam reforming gas and additional carbon dioxide. The methane steam reforming gas comprises hydrogen, carbon monoxide, and carbon dioxide. A volume ratio of $H_2$ to CO in the methane steam reforming gas can be greater than or equal to 3, preferably, greater than or equal to 5. For example, the methane steam reforming gas can comprise 14 volume (vol %) CO, 8 vol % $CO_2$, and 78 vol % $H_2$.

The methane steam reforming gas can be formed in a steam methane reformer by converting a gas comprising methane (such as natural gas) into a mixture comprising carbon monoxide, carbon dioxide, hydrogen, unreacted methane and water via Equations (1) and (2):

$$CH_4 + H_2O \leftrightarrows CO + 3H_2 \qquad (1)$$

$$CH_4 + CO_2 \leftrightarrows CO + 2H_2 \qquad (2)$$

Natural gas can comprise methane in an amount of greater than or equal to 75 mole percent (mol %), preferably, 80 to 97 mol %. Natural gas can also contain other gaseous hydrocarbons such as ethane (generally in an amount of 3 to 15 mol % based on the total moles of natural gas), propane, butane, and small amounts of higher hydrocarbons (generally less than 5 mol % based on the total moles of natural gas), as well as sulfur-containing gases, like hydrogen sulphide, in varying amounts. Further minor (or even trace) amounts of nitrogen, helium, carbon dioxide, water, odorants, and metals like mercury can also be present. The exact composition of natural gas varies with its source. It is noted that the sulfur-containing gases can be removed prior to the reforming, preferably to reduce the sulfur content to an amount of less than 1 part per million by volume.

The methane steam reforming can occur at high temperatures, preferably, 450 to 1,100° C., more preferably, 700 to 950° C., still more preferably, 850 to 900° C.; at a pressure of 1 to 4 mega Pascal (MPa), preferably, 3 to 4 MPa; and in the presence of a reforming catalyst, such as a nickel-based catalyst.

The methane steam reforming gas and the additional carbon dioxide can be added to a contacting zone in a volume ratio of 2 to 4. The volume ratio of $H_2$ to total $CO_2$, where the total $CO_2$ is equal to the $CO_2$ present in the methane steam reforming gas plus the CO$_2$ in the additional CO$_2$, can be 1 to 2. The methane steam reforming gas and the additional carbon dioxide can be fed to a contacting zone as two separate streams or can be combined prior to being fed to the contacting zone.

The contacting zone can be a reactor such as a continuous fixed bed reactor. The walls of the contacting zone can be free of nickel or can be lined with an inert material such as glass, as nickel can have a catalytic activity in methanation reactions.

The contacting can occur under isothermal or adiabatic conditions. The contacting can occur under isothermal conditions at a temperature of 620 to 650° C., preferably, 630 to 650° C., more preferably, 640 to 650° C. The contacting can occur at a pressure of 0.1 to 6 MPa, preferably, 1.5 to 5 MPa, more preferably, 2 to 4 MPa. The contact time between the feed and the manganese oxide catalyst can be 0.5 to 6 seconds (s), preferably, 1.5 to 5 s, more preferably, 2 to 4 s.

During the contacting, at least a portion of the carbon dioxide is converted to carbon monoxide through the reverse water gas shift (RWGS) reaction. The product gas therefore comprises carbon monoxide, water, unconverted carbon dioxide, and hydrogen. This can, in case of excess hydrogen, also be represented by the following Equation (3):

$$CO_2 + 2H_2 \rightleftharpoons CO + H_2 + H_2O \quad (3)$$

The water formed in this reaction is removed from the product stream driving the equilibrium of the reaction in the desired direction, because water often interferes with subsequent reactions utilizing the syngas. Water can be removed from the product stream by, for example, condensation, liquid/gas separation, and the like. Water can be removed such that less than or equal to 0.05 vol % water is present in the contacting zone.

The additional carbon dioxide can originate from various sources. The additional carbon dioxide can come from a waste gas stream, e.g., from a plant on the same site, for example, from ammonia synthesis, optionally with (non-catalytic) adjustment of the gas composition, or after recovering the carbon dioxide from a gas stream. Recycling such carbon dioxide as starting material thus contributes to reducing the amount of carbon dioxide emitted to the atmosphere (from a chemical production site). The additional carbon dioxide can also at least partly have been removed from the effluent gas of the contacting zone and recycled back to the zone in the additional carbon dioxide.

The manganese oxide catalyst can comprise manganese oxide, for example, MnO$_2$, Mn$_2$O$_3$, Mn$_3$O$_4$, or a combination comprising one or more of the foregoing. The manganese oxide catalyst can comprise a second metal oxide, where the second metal can comprise lanthanum (La), calcium (Ca), potassium (K), tungsten (W), copper (Cu), aluminum (Al), or a combination comprising one or more of the foregoing. The second metal oxide can comprise lanthanum oxide. The second metal can comprise copper and is herein referred to as a manganese oxide-copper oxide catalyst. The ratio of manganese to a second metal can be 4:1 to 1:4, preferably, 3:1 to 1:3, more preferably, 1:2 to 2:1, even more preferably, 1:1.5 to 1.5:1, still more preferably, 1:1.

The metal source for one or both of the manganese and the second metal can be a group that exchanges with oxygen under high temperatures so that the metal compounds become metal oxides, for example, a nitrate, a halide, an organic acid, an inorganic acid, a hydroxide, a carbonate, an oxyhalide, a sulfate, or a combination comprising one or more of the foregoing.

The manganese oxide catalyst can be a supported catalyst. The support material can be an inert support such as alumina (such as Al$_2$O$_3$), magnesia (such as MgO), silica, titania, zirconia, or a composition comprising one or more of the foregoing. The manganese oxide catalyst can comprise 40 to 95 weight percent (wt %), preferably, 50 to 90 wt %, more preferably, 60 to 85 wt % of a support based on total weight of the metal oxide and support. The manganese oxide catalyst can comprise 1 to 50 wt %, preferably, 5 to 30 wt %, more preferably, 5 to 15 wt % of manganese based on the total weight of the metal oxide and support. The manganese oxide catalyst can comprise 1 to 30 wt %, preferably, 2.5 to 25 wt %, more preferably, 7.5 to 12.5 wt %, even more preferably 10 wt % of manganese based on the total weight of the metal oxide and support. The manganese oxide catalyst can comprise 0.1 to 95 wt %, preferably, 1 to 30 wt %, more preferably, 2.5 to 25 wt %, more preferably, 5 to 20 wt %, even more preferably, 5 to 15 wt %, still more preferably 7.5 to 12.5 wt %, still more preferably 10 wt % of a second metal based on the total weight of the metal oxide and support. The manganese oxide catalyst can comprise 0.1 to 95 wt %, specifically, 0.1 to 50 wt %, more specifically, 1 to 10 wt %, even more specifically, 2 to 8 wt % of copper based on the total weight of the manganese oxide catalyst and support.

The manganese oxide catalyst can be a formed catalyst and can be prepared by methods such as tableting, pelletizing, or extruding the support and optionally the chromium into a shape such as a sphere, a tablet, a pellet, an extrudate, or the like. If the metal oxide is not present during forming, then the metal can be impregnated onto the support. The formed catalyst can then be dried and/or calcined. The formed catalyst can be in the shape of, for example, spherical pellets, extrudates, tablets, rings, and the like. The formed catalyst can be a sphere with an average diameter of 5 micrometers to 15 millimeters (mm). The formed catalyst can be an extrudate with an average diameter of 0.5 to 10 mm and an average length of 1 to 15 mm.

The manganese oxide catalyst, under isothermal conditions, can have a conversion of carbon dioxide (CO$_2$) of at least 50% preferably, at least 55%, more preferably, at least 60%.

The product syngas can have an H$_2$:CO volume ratio of 1.5 to 3, preferably, 2 to 2.5. The product syngas can be used in a Fischer-Tropsch reaction (herein referred to as the conversion reaction) to convert the carbon monoxide and hydrogen into C$_{2+}$ hydrocarbons, preferably, into C$_{2-6}$ hydrocarbons. It is noted that C$_{2+}$ hydrocarbons refers to hydrocarbons comprising 2 or more carbon atoms. The C$_{2+}$ hydrocarbons can be aliphatic and/or aromatic hydrocarbons.

The product syngas can be combined with molecular oxygen prior to and/or during the conversion reaction. The oxygen can be present in the conversion reaction in an amount of at least 0.1 mol %, preferably, 0.2 to 5 mol %, more preferably, 0.3 to 2.5 mol %, still more preferably, 0.35 to 1 mol %, still more preferably, 0.35 to 0.5 mol % Likewise, the conversion reaction can be free of oxygen.

An inert gas can be present in the conversion reaction, where the term "inert gas" as used herein relates to any element that is in gas-phase under the conditions in which the Fischer-Tropsch catalyst (also referred to herein as the conversion catalyst) is contacted with the product syngas and which does not participate in and/or interfere with the Fischer-Tropsch reaction. Preferably, the inert gas comprises nitrogen (N$_2$).

The conversion reaction can occur at a temperature of 100 to 400° C., preferably, 275 to 350° C., more preferably, 150 to 300° C., even more preferably, 150 to 230° C. Likewise, the conversion reaction can preferably occur at a temperature of 300 to 400° C., preferably, 330 to 350° C. The conversion reaction can occur at a total space velocity of the syngas of 400 to 1200 inverse hours ($h^{-1}$).

The conversion reaction can occur in the presence of a conversion catalyst. The conversion catalyst can comprise a metal oxide, where the metal can comprise cobalt, iron, ruthenium, nickel, or a combination comprising one or more of the foregoing. The conversion catalyst can comprise a secondary metal oxide. The secondary metal can comprise potassium, copper, manganese, chromium, molybdenum, vanadium, or a combination comprising one or more of the foregoing. If oxygen is present in the conversion reaction, then the conversion catalyst can be free of manganese, chromium, molybdenum, copper, and vanadium. The conversion catalyst can comprise a support such as alumina ($Al_2O_3$), silica ($SiO_2$), titania ($TiO_2$), zirconia ($ZrO_2$), magnesia (MgO), or a combination comprising one or more of the foregoing.

EXAMPLES

Example 1: Manganese Oxide Catalyst Preparation

The manganese oxide catalyst was prepared with an alumina ($Al_2O_3$) support using a co-precipitation method. Specifically, in a 1000 mL beaker, under stirring at 400 rpm, 10.53 g of $Mn(NO_3)_2.4H_2O$, 8.15 g of a $Cu(NO_3)_2.3H_2O$, and 135.2 g of $Al(NO_3)_3.9H_2O$. A 20 wt % solution of $NH_4OH$ was added to the salt mixture in small portions until a pH of a resulting slurry was adjusted to pH 9.0. The slurry was then stirred for 10 minutes to stabilize the pH. If there was any deviation, then more of the 20 wt % solution of $NH_4OH$ was added to the slurry to keep the pH constant at pH 9.0. The mixture was then heated using a Cimarac-II, heating mantle heating knob was set at position #10. When the temperature reached 70° C., the heating knob was set back to position #3. The temperature of the mixture was stabilized at 75±3° C. and kept at that temperature for 30 minutes. Stirring and heating of the mixture was then stopped and the slurry was cooled to room temperature and filtered under vacuum. The catalyst precursor was then kept under vacuum for 30 minutes until all the water was drained. The cake was then transferred to a porcelain dish and placed in a heating oven for calcination. The catalyst precursor was heated at a rate of 5° C./minute up to a drying temperature of 125° C. and held at that temperature for 6 hours. Next, the catalyst precursors were heated at 10° C./minute up to a temperature of 250° C. for 6 hours, in an air flow of 3.0 liters per minute (L/min). Next, the catalyst precursor was heated at 10° C./minute up to a temperature of 650° C., in an air flow of 3.0 L/min. The solid catalyst was then crushed into a powder and sieved through a screen having a mesh value between 20 and 50 mesh to form a product.

The resulting manganese oxide catalyst had a Mn content of 10 wt % and a Cu content of 5 wt % based on the total manganese oxide catalyst weight plus binder.

Example 2: Temperature Dependence on Manganese Oxide Catalyst Performance

The manganese oxide catalyst performance at different temperatures was tested, where 26.2 cc/min of a blend gas comprising 14 volume percent (vol %) CO, 8 vol % $CO_2$, and 78 vol % $H_2$ and 6.2 cubic centimeters per minute (cc/min) of additional $CO_2$ were introduced to 2 g of the manganese oxide catalyst of Example 1. After 18 days on stream, the flow rates of the methane steam reforming gas and the additional $CO_2$ were adjusted to 34 cc/min and 8.5 cc/min, respectively. The conversion data is tabulated in Table 1.

TABLE 1

| Time (days) | Temperature (° C.) | Products (mol %) | | | | $CO_2$ Conversion (%) |
| --- | --- | --- | --- | --- | --- | --- |
| | | $CO_2$ | CO | $H_2$ | $CH_4$ | |
| 8 | 620 | 25.5 | 30.9 | 43.3 | 0.02 | 54.8 |
| 9 | 640 | 24.8 | 31.5 | 43.2 | 0.02 | 55.8 |
| 10 | 640 | 24.7 | 31.4 | 43.1 | 0.01 | 55.8 |
| 11 | 650 | 24.6 | 32.0 | 43.1 | 0.01 | 56.4 |
| 12 | 650 | 24.4 | 32.4 | 42.6 | 0.01 | 56.4 |
| 22 | 620 | 17.0 | 24.3 | 58.5 | 0.02 | 58.8 |
| 25 | 640 | 16.2 | 25.5 | 58.1 | 0.03 | 61.1 |

Example 3: Manganese Oxide Catalyst Performance at 630° C.

The long term stability of the manganese oxide catalyst of Example 1 was studied, where 26.2 cc/min of a blend gas comprising 14 vol % CO; 8 vol % $CO_2$; and 78 vol % $H_2$ and 6.7 cc/min of additional $CO_2$ were introduced to a reactor. The conversion data is tabulated in Table 2.

TABLE 2

| Time (days) | Temperature (° C.) | Products (mol %) | | | | $CO_2$ Conversion (%) |
| --- | --- | --- | --- | --- | --- | --- |
| | | $CO_2$ | CO | $H_2$ | $CH_4$ | |
| 3 | 630 | 15.5 | 24.4 | 59.9 | 0.01 | 61.1 |
| 4 | 630 | 15.7 | 24.7 | 59.5 | 0.01 | 61.1 |
| 5 | 630 | 15.7 | 24.8 | 59.4 | 0.01 | 61.1 |
| 7 | 630 | 15.9 | 25.1 | 58.9 | 0.01 | 61.1 |
| 9 | 630 | 15.8 | 24.9 | 59.2 | 0.01 | 61.1 |
| 11 | 630 | 15.9 | 24.8 | 59.3 | 0.02 | 61.1 |
| 13 | 630 | 16.1 | 25.3 | 58.5 | 0.02 | 61.0 |
| 15 | 630 | 15.8 | 24.9 | 59.1 | 0.01 | 61.1 |
| 17 | 630 | 15.8 | 24.8 | 59.2 | 0.01 | 61.1 |
| 19 | 630 | 15.7 | 24.7 | 59.5 | 0.02 | 61.1 |
| 21 | 630 | 15.6 | 24.5 | 59.8 | 0.01 | 61.1 |
| 23 | 630 | 15.6 | 24.5 | 59.8 | 0.01 | 61.1 |
| 25 | 630 | 15.7 | 24.7 | 59.4 | 0.01 | 61.1 |
| 35 | 630 | 15.2 | 23.6 | 60.7 | 0.03 | 61.1 |
| 36 | 630 | 15.1 | 23.4 | 61.4 | 0.02 | 60.7 |
| 38 | 630 | 14.9 | 23.0 | 61.9 | 0.02 | 60.7 |
| 38 | 630 | 14.9 | 23.0 | 61.9 | 0.02 | 60.7 |
| 39 | 630 | 14.8 | 22.9 | 62.1 | 0.02 | 60.7 |
| 40 | 630 | 14.7 | 22.8 | 62.3 | 0.02 | 60.6 |
| 40 | 630 | 14.8 | 22.9 | 62.1 | 0.02 | 60.6 |
| 41 | 630 | 14.8 | 22.9 | 62.2 | 0.01 | 60.6 |
| 42 | 630 | 14.9 | 23.0 | 62.1 | 0.02 | 60.6 |
| 42 | 630 | 14.9 | 23.0 | 62.1 | 0.02 | 60.6 |
| 44 | 630 | 14.9 | 23.1 | 61.8 | 0.01 | 60.7 |
| 46 | 630 | 14.8 | 23.2 | 61.9 | 0.01 | 61.0 |
| 48 | 630 | 14.7 | 23.2 | 61.0 | 0.01 | 61.0 |
| 50 | 630 | 14.7 | 23.0 | 62.2 | 0.01 | 61.0 |
| 51 | 630 | 14.7 | 23.1 | 62.1 | 0.01 | 61.0 |
| 53 | 630 | 14.5 | 22.8 | 62.5 | 0.01 | 61.0 |
| 55 | 630 | 14.5 | 22.8 | 62.5 | 0.01 | 60.9 |
| 57 | 630 | 14.6 | 22.9 | 62.4 | 0.01 | 60.9 |
| 59 | 630 | 14.6 | 22.8 | 62.4 | 0.01 | 60.8 |
| 62 | 630 | 14.6 | 22.8 | 62.4 | 0.01 | 60.9 |
| 64 | 630 | 14.6 | 22.7 | 62.5 | 0.01 | 60.8 |
| 67 | 630 | 14.4 | 22.5 | 63.0 | 0.01 | 60.9 |
| 69 | 630 | 14.6 | 22.8 | 62.4 | 0.01 | 60.9 |

TABLE 2-continued

| Time (days) | Temperature (° C.) | Products (mol %) | | | | $CO_2$ Conversion (%) |
|---|---|---|---|---|---|---|
| | | $CO_2$ | CO | $H_2$ | $CH_4$ | |
| 71 | 630 | 14.6 | 22.7 | 62.6 | 0.01 | 60.8 |
| 73 | 630 | 14.6 | 22.6 | 62.7 | 0.01 | 60.8 |
| 76 | 630 | 14.8 | 22.8 | 62.5 | 0.01 | 60.7 |
| 77 | 630 | 14.7 | 22.6 | 62.6 | 0.01 | 60.8 |
| 79 | 630 | 14.5 | 22.5 | 62.9 | 0.01 | 60.7 |
| 81 | 630 | 14.4 | 22.4 | 63.0 | 0.01 | 60.7 |
| 84 | 630 | 14.4 | 22.3 | 63.2 | 0.01 | 60.7 |
| 92 | 630 | 14.4 | 24.5 | 60.9 | 0.02 | 62.9 |
| 95 | 630 | 13.8 | 23.2 | 62.6 | 0.01 | 62.6 |
| 98 | 630 | 13.9 | 23.2 | 62.8 | 0.01 | 62.5 |
| 107 | 630 | 13.8 | 23.2 | 62.9 | 0.01 | 62.6 |
| 111 | 630 | 13.7 | 22.9 | 63.3 | 0.01 | 62.5 |
| 114 | 630 | 13.9 | 23.2 | 62.8 | 0.01 | 62.5 |
| 118 | 630 | 13.7 | 22.8 | 62.5 | 0.01 | 62.5 |
| 123 | 630 | 13.7 | 22.6 | 63.6 | 0.01 | 62.3 |
| 131 | 630 | 13.7 | 22.5 | 62.1 | 0.01 | 62.1 |
| 136 | 630 | 13.7 | 22.6 | 62.2 | 0.01 | 62.2 |

Table 2 shows that the manganese oxide catalyst activity at 630° C. did not decrease even after 136 days on stream.

Set forth below are some embodiments of the present process.

Embodiment 1 a process of adjusting an $H_2$:CO ratio in a methane steam reforming gas, comprising: contacting a methane steam reforming gas and an additional carbon dioxide in a contacting zone under isothermal conditions at a temperature of 620 to 650° C.; wherein the methane steam reforming gas comprises CO and $H_2$ and has an $H_2$:CO ratio of greater than or equal to 4; and reacting $CO_2$ and the $H_2$ in the presence of a manganese oxide-copper oxide catalyst to produce a product syngas having an $H_2$:CO ratio of less than or equal to 2.5; and removing water from the contacting zone.

Embodiment 2 the process of Embodiment 1, further comprising converting the product syngas to $C_{2+}$ hydrocarbons in the presence of a Fischer-Tropsch catalyst.

Embodiment 3 a process of making $C_{2+}$ hydrocarbons comprising: contacting a feed comprising a methane steam reforming gas and an additional carbon dioxide with a manganese oxide-copper oxide catalyst to produce a product syngas in a contacting zone under isothermal conditions at a temperature of 620 to 650° C.; and converting the product syngas to $C_{2+}$ hydrocarbons in the presence of a Fischer-Tropsch catalyst; wherein the methane steam reforming gas has an initial $H_2$:CO volume ratio greater than 3; wherein the product syngas has a $H_2$:CO volume ratio of 1.5 to 3; and wherein the contacting further comprises removing water.

Embodiment 4 the process of any of Embodiments 2-3, wherein the $C_{2+}$ hydrocarbons are $C_{2-6}$ hydrocarbons.

Embodiment 5 the process of any of Embodiments 2-4, wherein the converting occurs in the presence of molecular oxygen.

Embodiment 6 the process of any of Embodiments 2-4, wherein the converting occurs in the absence of molecular oxygen.

Embodiment 7 the process of any of Embodiments 2-6, wherein the converting occurs at a temperature of 100 to 400° C.

Embodiment 8 the process of any of Embodiments 2-7, wherein the Fischer-Tropsch catalyst comprises a metal oxide, where the metal comprises cobalt, iron, ruthenium, nickel, or a combination comprising one or more of the foregoing.

Embodiment 9 the process of any of Embodiments 2-8, wherein the Fischer-Tropsch catalyst comprises a secondary metal oxide.

Embodiment 10 the process of Embodiment 9, wherein the secondary metal comprises potassium, copper, manganese, chromium, molybdenum, vanadium, or a combination comprising one or more of the foregoing.

Embodiment 11 the process of Embodiment 9, wherein the Fischer-Tropsch catalyst is free of manganese, chromium, molybdenum, copper, and vanadium.

Embodiment 12 the process of any of Embodiments 2-11, wherein the Fischer-Tropsch catalyst comprises a support, and wherein the support comprises alumina, silica, titania, zirconia, magnesia, or a combination comprising one or more of the foregoing.

Embodiment 13 the process of any of Embodiments 1-12, wherein the water is removed such that less than or equal to 0.05 vol % water is present in the contacting zone.

Embodiment 14 the process of any of Embodiments 1-13, wherein the initial $H_2$:CO volume ratio is greater than 5.

Embodiment 15 the process of any of Embodiments 1-14, further comprising converting a methane feed into the methane steam reforming gas in the presence of a nickel-based catalyst.

Embodiment 16 the process of Embodiment 15, wherein the methane feed comprises natural gas.

Embodiment 17 the process of any of Embodiments 15-16, wherein the methane feed comprises greater than or equal to 75 mol % methane based on the total moles of the methane feed.

Embodiment 18 the process of Embodiment 17, wherein the methane feed comprises 80 to 97 mol % methane based on the total moles of the methane feed.

Embodiment 19 the process of any of Embodiments 15-18, wherein the methane feed comprises a sulfur contaminant and wherein the process further comprises reducing the amount of sulfur-containing contaminant to an amount of less than 1 part per million by volume.

Embodiment 20 the process of any of Embodiments 2-19, wherein the converting occurs at a temperature of 450 to 1100° C. and a pressure of 1 to 4 MPa.

Embodiment 21 the process of any of Embodiments 1-20, further comprising adding the methane steam reforming gas and the additional carbon dioxide in a volume ratio of 2 to 4.

Embodiment 22 the process of any of Embodiments 1-21, wherein a volume ratio of $H_2$ to total $CO_2$ is 1 to 2, wherein the total $CO_2$ is equal to a $CO_2$ present in the methane steam reforming gas plus the $CO_2$ in the additional $CO_2$.

Embodiment 23 the process of any of Embodiments 1-22, wherein the contacting zone is free of nickel.

Embodiment 24 the process of any of Embodiments 1-23, wherein the contacting zone is lined with an inert material.

Embodiment 25 the process of any of Embodiments 1-24, wherein the contacting occurs at a pressure of 0.1 to 6 MPa.

Embodiment 26 the process of any of Embodiments 1-25, wherein the contact time between the feed and the manganese oxide-copper oxide catalyst is 0.5 to 6 seconds.

Embodiment 27 the process of any of Embodiments 1-26, wherein the manganese oxide-copper oxide catalyst comprises a support.

Embodiment 28 the process of Embodiment 27, wherein the manganese oxide-copper oxide catalyst comprises 40 to 95 wt % of the support based on total weight of the metal oxide and support.

Embodiment 29 the process of any of Embodiments 27-28, wherein the support comprises alumina, magnesia, silica, titania, zirconia, or a composition comprising one or more of the foregoing. The support can comprise alumina.

Embodiment 30 the process of any of Embodiments 27-29, wherein the manganese oxide-copper oxide catalyst comprises 1 to 50 wt % of manganese based on the total weight of the manganese oxide-copper oxide catalyst and support.

Embodiment 31 the process of any of Embodiments 27-30, wherein the manganese oxide-copper oxide catalyst comprises 0.1 to 95 wt % of lanthanum based on the total weight of the manganese oxide-copper oxide catalyst and support.

Embodiment 32 the process of any of Embodiments 27-31, wherein the manganese oxide-copper oxide catalyst comprises 0.1 to 95 wt %, specifically, 0.1 to 50 wt %, more specifically, 1 to 10 wt %, even more specifically, 2 to 8 wt % of copper based on the total weight of the manganese oxide-copper oxide catalyst and support.

Embodiment 33 the process of any of Embodiments 1-32, wherein the product syngas has a $H_2$:CO volume ratio of 2 to 2.5.

Embodiment 34 the process of any of Embodiments 1-33, wherein the contacting is at a temperature of 630 to 650° C.

Embodiment 35 the process of any of Embodiments 1-34, wherein the contacting is at a temperature of 640 to 650° C.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants, or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more preferably, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

Disclosure of a narrower range in addition to a broader range is not a disclaimer of the broader range.

We claim:

1. A process of making $C_{2+}$ hydrocarbons comprising: contacting a feed comprising a methane steam reforming gas and an additional carbon dioxide with a manganese oxide-copper oxide catalyst to produce a product syngas in a contacting zone under isothermal conditions at a temperature of 620 to 650° C.; and
converting the product syngas to $C_{2+}$ hydrocarbons in the presence of a Fischer-Tropsch catalyst;
wherein the methane steam reforming gas has an initial $H_2$:CO volume ratio greater than 3; wherein the product syngas has a $H_2$:CO volume ratio of 1.5 to 3; and wherein the contacting further comprises removing water.

2. The process of claim 1, wherein the water is removed such that less than or equal to 0.05 vol % water is present in the contacting zone.

3. The process of claim 1, wherein the initial $H_2$:CO volume ratio is greater than 5.

4. The process of claim 1, further comprising converting a methane feed into the methane steam reforming gas in the presence of a nickel-based catalyst.

5. The process of claim 1, further comprising adding the methane steam reforming gas and the additional carbon dioxide in a volume ratio of 2 to 4.

6. The process of claim 1, wherein a volume ratio of $H_2$ to total $CO_2$ is 1 to 2, wherein the total $CO_2$ is equal to a $CO_2$ present in the methane steam reforming gas plus the $CO_2$ in the additional $CO_2$.

7. The process of claim 1, wherein the contacting occurs at one or both of a pressure of 0.1 to 6 MPa, and a contact time between the feed and the manganese oxide-copper oxide catalyst of 0.5 to 6 seconds.

8. The process of claim 1, wherein the manganese oxide-copper oxide catalyst comprises 40 to 95 wt % of a support based on total weight of the metal oxide and support.

9. The process of any of claim 8, wherein the manganese oxide-copper oxide catalyst comprises one or both of 1 to 50 wt % of manganese and 0.1 to 95 wt % of copper; based on the total weight of the manganese oxide-copper oxide catalyst and support.

10. The process of claim 1, wherein the product syngas has an $H_2$:CO volume ratio of 2 to 2.5.

11. The process of claim 1, wherein the $C_{2+}$ hydrocarbons are $C_{2-6}$ hydrocarbons.

12. The process of claim 1, wherein the Fischer-Tropsch catalyst comprises a metal oxide comprising a metal, and where the metal comprises cobalt, iron, ruthenium, nickel, or a combination comprising one or more of the foregoing.

13. A process of adjusting a $H_2$:CO ratio in a methane stream reforming gas, comprising:
contacting the methane steam reforming gas and an additional carbon dioxide in a contacting zone under isothermal conditions at a temperature of 620 to 650° C.; wherein the methane steam reforming gas comprises CO and $H_2$ and has a $H_2$:CO ratio of greater than or equal to 4; and
reacting $CO_2$ and the $H_2$ in the presence of a manganese oxide-copper oxide catalyst to produce a product stream having a $H_2$:CO ratio of less than or equal to 2.5; and
removing water from the contacting zone.

14. The process of claim 13, further comprising using the product stream of in a Fischer-Tropsch reaction.

15. The process of claim 13, wherein the contacting is at a temperature of 630 to 650° C.

16. The process of claim 13, further comprising adding the methane steam reforming gas and the additional carbon dioxide in a volume ratio of 2 to 4.

17. The process of claim 13, wherein the water is removed such that less than or equal to 0.05 vol % water is present in the contacting zone.

18. The process of claim 13, wherein the contacting occurs in the presence of a manganese oxide-copper oxide catalyst.

19. The process of claim 18, wherein the manganese oxide-copper oxide catalyst comprises 40 to 95 wt % of a support based on the total weight of the metal oxide and support.

20. The process of claim 19, wherein the manganese oxide-copper oxide catalyst comprises one or both of 1 to 50 wt % of manganese and 0.1 to 95 wt % of copper; based on the total weight of the manganese oxide-copper oxide catalyst and support.

* * * * *